Feb. 20, 1968   K. H. MILLER   3,369,374
CAPACITY CONTROL FOR REFRIGERATION SYSTEMS
Filed June 20, 1966

INVENTOR.
KENNETH H. MILLER.

ATTORNEY.

3,369,374
CAPACITY CONTROL FOR REFRIGERATION
SYSTEMS
Kenneth H. Miller, Syracuse, N.Y., assignor to Carrier
Corporation, Syracuse, N.Y., a corporation of Delaware
Filed June 20, 1966, Ser. No. 558,709
6 Claims. (Cl. 62—197)

This invention relates to refrigeration systems, and more particularly, to a capacity control means for refrigeration systems.

In refrigeration systems which employ compression means operated at a substantially constant speed, the capacity of the system can be varied by regulating the pumping effect of the system compression means. In systems employing centrifugal compressors for example, adjustable vanes are provided at the compressor inlet to regulate return flow of the refrigerant to the compressor. In systems having a reciprocating compressor certain of the compressor cylinders can be bypassed to effectively reduce the compressor capacity. However, known arrangements for controlling the capacity of systems having constant speed compressors including those alluded to above are relatively expensive and often entail a substantial loss in efficiency.

It is a principal object of the present invention to provide a new and improved refrigeration system.

It is a further object of the present invention to provide an improved refrigeration system incorporating a vortex type fluid regulator to control system capacity.

It is an object of the present invention to provide a refrigeration system having a fluid regulator for controlling flow of suction gas to the system compressor in accordance with the load imposed upon the system to thereby regulate system capacity.

This invention relates to a refrigeration system comprising in combination, compression means; a first heat exchanger for condensing refrigerant discharged from the compression means; refrigerant metering means connected with the first heat exchanger; a second heat exchanger for evaporating refrigerant, the second heat exchanger being arranged between the metering means and the compression means; and means for controlling capacity of the system including a fluid flow regulator forming a vortex chamber through which system refrigerant passes en route to the compression means; a source of pressurized control fluid in substantially tangential communication with the vortex chamber, the control fluid being adapted to cause refrigerant flowing through the regulator vortex chamber to follow a vortex-like path; and means for varying discharge of the control fluid into the regulator vortex chamber in response to system load conditions to vary flow of refrigerant through the fluid regulator and capacity of the system in response to changes in system load.

Figure 1:
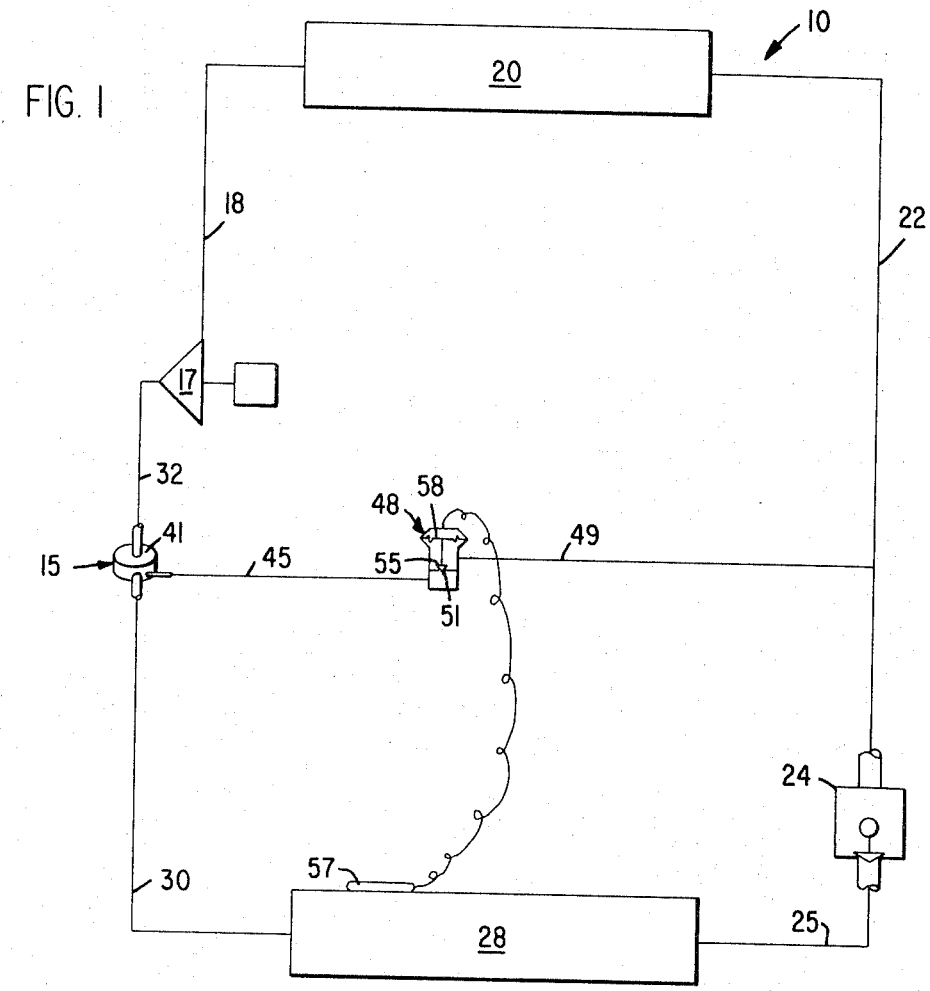
Figure 2:
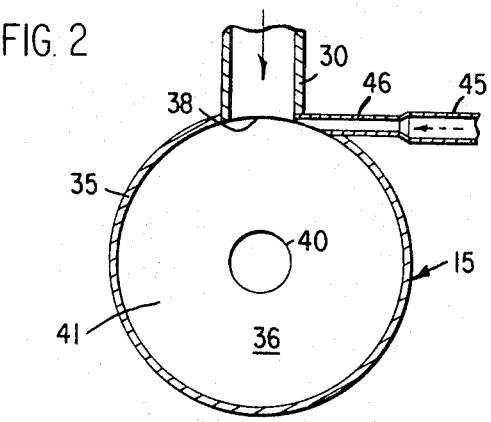

Other objects and advantages of the present invention will be readily perceived from the ensuing description and drawings in which:

FIGURE 1 is a schematic view of a refrigeration system incorporating the capacity control of the present invention; and FIGURE 2 is a cross-sectional view of the fluid regulator capacity controlling means of FIGURE 1.

Referring to FIGURE 1 of the drawings, there is shown a refrigeration system 10 utilizing a vortex type fluid regulator or amplifier 15 to control system capacity. The refrigeration system 10 includes a suitable compression means such as centrifugal compressor 17. Gaseous refrigerant discharged from compressor 17 passes through line 18 to system condenser 20 where the refrigerant is condensed. Condensed refrigerant from condenser 20 passes through line 22 to the system expansion device which may comprise float type expansion valve 24.

Expansion valve 24 feeds reduced pressure refrigerant through line 25 to the system evaporator 28. The thermal interchange effected by evaporator 28 between the refrigerant therein and the medium cooled, for example water, vaporizes the refrigerant while cooling the medium. Suitable means, for example, a pump (not shown) may be provided for circulating the medium cooled.

Vaporized refrigerant from evaporator 28 returns through line 30, fluid regulator 15 and line 32 to the suction side of compressor 17. As will be more apparent hereafter, fluid regulator 15 controls the return flow of refrigerant to compressor 17 in accordance with the load imposed upon the system to govern system capacity.

Referring to FIGURES 1 and 2 of the drawing, fluid regulator 15 comprises a housing 35 forming a generally cylindrical vortex chamber 36. Refrigerant line 30, connected to inlet 38 in the peripheral wall of regulator housing 35, discharges, during system operation, a stream of refrigerant into vortex chamber 36. System refrigerant line 32 is connected to central outlet 40 in end wall 41 of the regulator housing 35. As is apparent, the stream of refrigerant, in passing through vortex chamber 36 of regulator 15, undergoes an approximate 90° change in direction.

Control line 45, having an orifice portion 46 opening substantially tangentially into vortex chamber 36, is connected to control valve 48. Control valve 48 is connected to a suitable source of pressure fluid. In the exemplary arrangement shown, line 49 connects control valve 48 with the system liquid line 22. Alternately, control valve 48 may be connected with compressor discharge line 18.

Control valve 48 regulates the amount of pressurized control fluid discharged from orifice 46 into vortex chamber 36 of regulator 15 in response to the load imposed upon the system. In the exemplary arrangement illustrated, control valve 48 includes port 51 and diaphragm powered valve 55 for regulating flow of pressurized control fluid therethrough. Feeler bulb 57 of control valve 48 may be arranged in heat exchange relation with system evaporator 28. As temperatures of the refrigerant in evaporator 28 change, indicating changes in system load, valve diaphragm 58 moves valve 55 to change the discharge of pressurized control fluid from control line orifice 46 into regulator 15.

While a thermal type valve 48 is shown for controlling flow of pressurized control fluid to regulator 15, other means for governing flow of control fluid to regulator 15 in response to system load will be apparent to those skilled in the art.

The discharge of pressurized control fluid from orifice 46 tangentially into vortex chamber 36 of fluid regulator 15 intercepts the principal stream of refrigerant issuing from inlet 38, and causes the stream of refrigerant to swirl within vortex chamber 36. Since fluid outlet 40 is coaxial with vortex chamber 36, the refrigerant under the influence of the stream of pressurized control fluid issuing from orifice 46, follows a vortex-like path through chamber 36 to outlet 40. By forcing the refrigerant stream to follow a vortex-like path through chamber 36 of regulator 15, total fluid flow through regulator 15 is reduced. The change in total fluid flow through regulator 15 is proportional to the rate at which pressurized control fluid is introduced into the vortex chamber of regulator 15.

In the refrigeration system of the present invention, control valve 48 varies the flow of pressurized control fluid through orifice 46 into fluid regulator 15 in response to changes in system load conditions. As the discharge of pressurized control fluid into vortex chamber 36 of regulator 15 changes, the vortex effect created within the vortex chamber 36 changes with a corresponding change in refrigerant passing through regulator 15 to line 32 and the suction side of compressor 17. Since the capacity of the system is responsive to the quantity of refrigerant pumped by compressor 17, varying the quantity of refrigerant fed to the compressor varies system capacity.

Compressors other than centrifugal, for example, reciprocating, may be readily contemplated. Similarly, other types of expansion devices, such as a thermal expansion valve or capillary line, may be employed in place of float type valve 24, particularly in lower capacity systems.

While I have described a preferred embodiment of my invention, it will be understood that my invention is not limited thereto since it may be otherwise embodied within the scope of the following claims.

I claim:

1. In a refrigeration system, the combination of: compression means; a first heat exchanger for condensing refrigerant discharged from said compression means; refrigerant metering means connected with said first heat exchanger; a second heat exchanger for evaporating refrigerant, said second heat exchanger being arranged between said metering means and said compression means; and means for controlling capacity of said system including a fluid flow regulator forming a vortex chamber through which system refrigerant passes en route to said compression means; a source of pressurized control fluid in substantially tangential communication with said vortex chamber, said control fluid being adapted to cause refrigerant flowing through said regulator vortex chamber to follow a vortex-like path, and means for varying discharge of said control fluid into said regulator vortex chamber in response to system load conditions to vary flow of refrigerant through said fluid regulator and capacity of said system in response to changes in system load.

2. A refrigeration system according to claim 1 in which said compression means comprises a constant speed centrifugal type compressor.

3. A refrigeration system according to claim 1 in which said pressurized control fluid comprises refrigerant from said system.

4. A refrigeration system according to claim 1 in which said pressurized control fluid comprises refrigerant drawn from said system between said condenser and said metering means.

5. A refrigeration system according to claim 1 in which said pressurized control fluid comprises refrigerant drawn through the discharge side of said compression means.

6. A refrigeration system according to claim 1 in which said load condition responsive means comprises a valve connecting said fluid regulator with said pressurized control fluid source movable to vary flow of said control fluid to said regulator in response to changes in system load.

References Cited

UNITED STATES PATENTS 2,963,878    12/1960    Beggs            62—197 XR
3,095,710    7/1963    Clark             61—217 XR MEYER PERLIN, *Primary Examiner.*